(12) United States Patent
Watanabe et al.

(10) Patent No.: US 8,343,253 B2
(45) Date of Patent: Jan. 1, 2013

(54) METHOD FOR PRODUCING CONDUCTOR FINE PARTICLES

(75) Inventors: Seiichi Watanabe, Sapporo (JP); Yu Toriyabe, Sapporo (JP); Shigeo Yatsu, Sapporo (JP); Tamaki Shibayama, Sapporo (JP); Tadahiko Mizuno, Sapporo (JP)

(73) Assignee: Kankyou Engineering Co., Ltd., Higashi-ku Sapporo (JP)

( * ) Notice: Subject to any disclaimer, the term of this patent is extended or adjusted under 35 U.S.C. 154(b) by 633 days.

(21) Appl. No.: 12/449,564

(22) PCT Filed: Feb. 15, 2008

(86) PCT No.: PCT/JP2008/000240
§ 371 (c)(1),
(2), (4) Date: Aug. 13, 2009

(87) PCT Pub. No.: WO2008/099618
PCT Pub. Date: Aug. 21, 2008

(65) Prior Publication Data
US 2010/0089759 A1    Apr. 15, 2010

(30) Foreign Application Priority Data
Feb. 15, 2007  (JP) ................................ 2007-034698

(51) Int. Cl.
*B22F 9/14* (2006.01)
(52) U.S. Cl. .................. 75/336; 75/346; 219/121.37
(58) Field of Classification Search ............ 75/346, 75/347
See application file for complete search history.

(56) References Cited

U.S. PATENT DOCUMENTS
6,777,639 B2 *   8/2004   Schroder et al. ......... 219/121.59
6,835,227 B2 *  12/2004   Lian et al. ..................... 75/351
2005/0092132 A1  5/2005   Hirata et al.
2006/0060464 A1  3/2006   Chang FOREIGN PATENT DOCUMENTS
| | | |
|---|---|---|
| JP | 2002-348603 A | 12/2002 |
| JP | 2004-124155 A | 4/2004 |
| JP | 2004-277812 A | 10/2004 |
| JP | 2005-521794 A | 7/2005 |
| JP | 2005-529455 A | 9/2005 |
| JP | 2006-97082 A | 4/2006 |
| WO | 03/037553 A1 | 5/2003 |

OTHER PUBLICATIONS

Chart for Supporting Patent Licensing (Patent Map) 2005, Ippan 18, Nanoparticle Production Technology (issued on Mar. 2006, National Center for Industry Property Information and Training).

* cited by examiner

*Primary Examiner* — George Wyszomierski
(74) *Attorney, Agent, or Firm* — Nath, Goldberg & Meyer; Jerald L. Meyer; Stanley N. Protigal

(57) ABSTRACT

A method for producing conductor fine particles in which the advantages of conventional vapor phase method and liquid phase method are utilized while eliminating the drawbacks of both methods remarkably. Furthermore, definite guidelines and measure for improvement are given to the greatest problems common to the vapor phase method and liquid phase method, i.e., enhancement in quality of the unit fine particle and a fine particle production method controllably temporarily and regionally. The method for producing conductor fine particles comprises a step for applying a voltage to a pair of electrode consisting of a positive electrode and a negative electrode arranged in conductive liquid and generating plasma in the vicinity of the negative electrode, and a step for producing conductor fine particles by melting the metal material of the negative electrode and then re-solidifying.

15 Claims, 13 Drawing Sheets

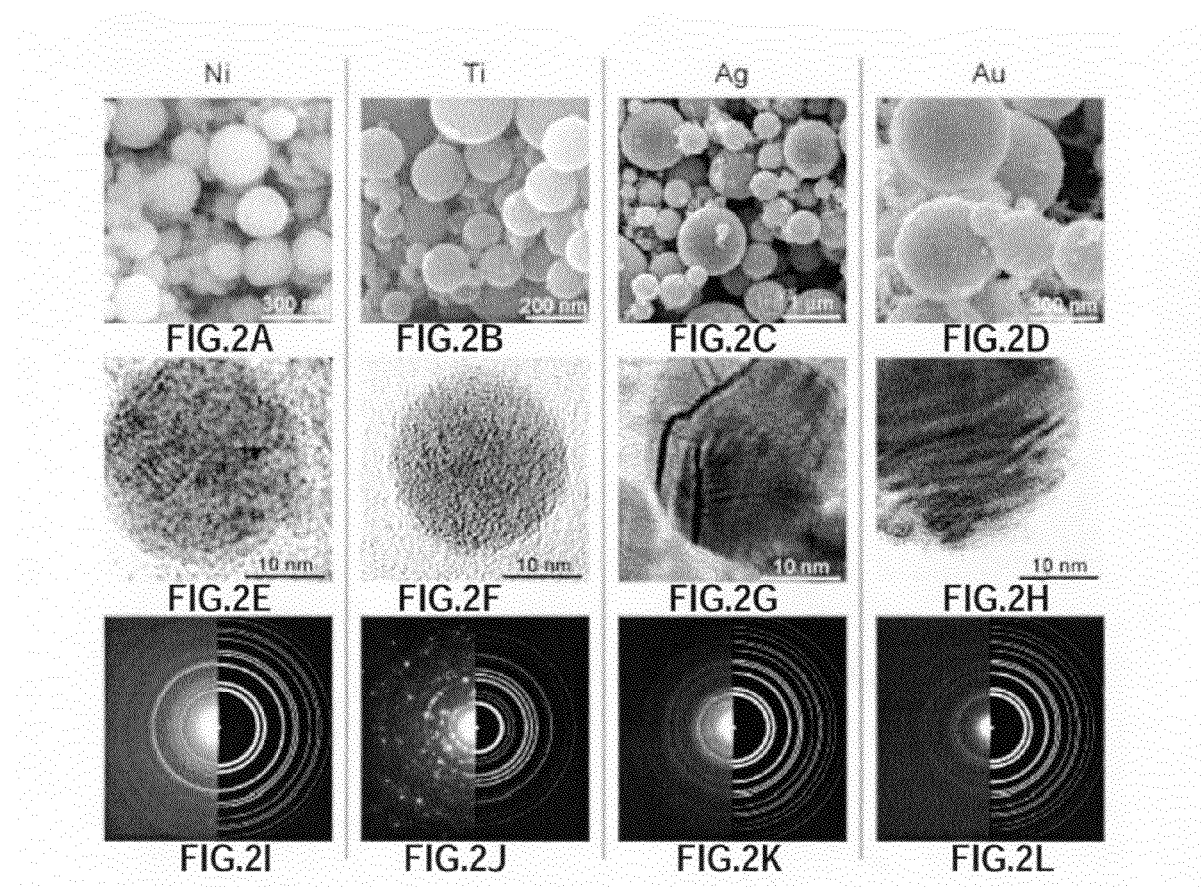

METHOD FOR PRODUCING CONDUCTOR FINE PARTICLES

This is a National Phase Application filed under 35 U.S.C. 371 as a national stage of PCT/JP2008/000240, filed Feb. 15, 2008, an application claiming the benefit of Japanese Patent Application No. 2007-034698 filed Feb. 15, 2007, the entire content of each of which is hereby incorporated by reference in its entirety.

TECHNICAL FIELD

The present invention relates to a method for producing conductor fine particles, more specifically to a method for producing conductor fine particles by utilizing submerged plasma discharge. Particularly, the present invention relates to a method for producing spherical conductor fine particles with an average particle diameter of 10-1,000 nm.

BACKGROUND ART

Nano-sized, conductor or non-conductor particles are generally produced in a single gas phase or liquid phase (see Non-Patent Document 1).

Gas-phase methods are continuous processes suitable for high-speed mass production of highly pure particles and have reached a higher degree of technical maturity than other methods. Nevertheless, gas-phase methods still face the greatest challenge of improving the quality of nanoparticles themselves, with productivity (yield) and cost effectiveness (cost reduction and equipment/process simplification) also remaining to be improved. Liquid-phase methods, on the other hand, can produce less aggregated particles with a uniform particle diameter, but are similarly facing the challenge of improving cost effectiveness and functions (e.g., catalyst characteristics), as well as the quality of nanoparticles themselves.

Solid-phase methods are under development since there remains considerable room for improvement in nanoparticle quality, productivity and cost effectiveness.

On the other hand, technologies are known that supply plasma in a fluid (see Patent Document 1). Patent Document 1 reports a plasma generation method which includes the steps of: providing a fluid in a bath having therein separately-arranged electrodes constituting a cathode electrode and an anode electrode; forming a stream of air bubbles in the fluid in the vicinity of the cathode electrode; and applying a voltage between the cathode and anode electrodes to cause glow discharge in the air bubbles for plasma generation. Patent Document 1 also reports that submerged plasma generation leads to production of fine particles from metal ions etc., contained in the fluid.

Other reported technologies are directed to metal coating by utilizing plasma generated in a fluid (see Patent Documents 2-4).

Patent Document 1: Japanese Patent Application Laid-Open No. 2005-529455
Patent Document 2: Japanese Patent Application Laid-Open No. 2006-097082
Patent Document 3: Japanese Patent Application Laid-Open No. 2004-277812
Patent Document 4: Japanese Patent Application Laid-Open No. 2005-521794
Non-Patent Document 1: Chart for Supporting Patent Licensing (Patent Map) 2005, Ippan 18, Nanoparticle Production Technology (issued on March 2006, National Center for Industry Property Information and Training)

DISCLOSURE OF INVENTION

Problems to be Solved by the Invention

It is an object of the present invention to provide a method for producing conductor fine particles, which utilizes the advantages of gas-phase methods and liquid-phase methods while eliminating the drawbacks of both methods remarkably. It is also an object of the present invention to draw up definite guidelines and measures for the greatest challenge common to the gas-phase method and liquid-phase method, i.e., enhancement in the quality of fine particles themselves, as well as for improvement of a fine particle production method which is controllable both temporarily and regionally.

Means for Solving the Problem

The present invention is directed to a method for producing conductor fine particles from negative electrode material by utilizing plasma generated using a pair of electrodes placed in a conductive liquid (in-liquid spark plasma). More specifically, the present invention relates to the following methods.

[1] A method for producing conductor fine particles including:
applying a voltage between a pair of positive and negative electrodes placed in a conducive liquid to generate plasma in the vicinity of the negative electrode; and
partially melting a conductive material constituting the negative electrode followed by re-solidifying to produce fine particles.

[2] The method according to [1], further including applying a magnetic field in the vicinity of the negative electrode.

[3] The method according to [2], wherein the direction of the magnetic field is parallel with the major axis of the negative electrode.

[4] The method according to [2] or [3], wherein the magnetic field has a magnetic flux density of 0.05 tesla or greater.

[5] The method according to any one of [2] to [4], wherein the magnetic field has a magnetic flux density of 1 tesla or greater.

[6] The method according to any one of [2] to [5], wherein the step of applying a magnetic field is performed after the step of generating plasma and before the step of generating fine particles.

[7] The method according to any one of [1] to [6], wherein the conductive liquid contains an electrolytic substance and a liquid which can dissolve the electrolytic substance.

[8] The method according to any one of [1] to [7], wherein a solvent of the conductive liquid is ethylene carbonate (EC), diethyl carbonate (DEC), propylene carbonate, dimethyl carbonate, water, or ionic liquid.

[9] The method according to any one of [1] to [8], wherein the conductive liquid contains water, and hydrogen is generated together with conductor fine particles by the method.

[10] The method according to any one of [1] to [9], wherein the positive electrode has a surface area larger than the surface area of the negative electrode.

[11] The method according to any one of [1] to [10], wherein the surface area of the positive electrode is 25 to 1,000 times as large as the surface area of the negative electrode.

[12] The method according to any one of [1] to [11], wherein the voltage is 10-1,000V.

[13] The method according to any one of [1] to [12], wherein the voltage is 80-300V.

[14] The method according to any one of [1] to [13], wherein the fine particles have an average particle diameter of 10-1,000 nm.

[15] The method according to any one of [1] to [14], wherein the fine particles are spherical.

[16] The method according to any one of [1] to [15], wherein the fine particles have particle diameters ranging from 3 nm to 2,000 nm.

Advantageous Effects of Invention

The inventive method can combine the advantages of conventional gas-phase methods and liquid-phase method because it utilizes a reaction process in a diphasic system containing both a liquid phase and a gas phase which has been partially or entirely changed into plasma phase by submerged discharge. In contrast to fine particle production by gas-phase method, the inventive method requires no vacuuming system, reduced pressure, or vacuum chamber.

For these reasons, the inventive method can produce a large amount of fine particles in a short time and can control the reaction site atmosphere more easily than gas-phase methods.

The following table shows physical properties and productivity of fine particles produced according to the present invention in comparison with those of fine particles produced by conventional methods.

TABLE 1

|  | Inventive method (plasma is used: physical process using energy beam) | Gas-phase method (CVD, gas atomizing, etc.) | Liquid-phase method (chemical synthesis) | Solid-phase method (pulverizing, mechanical alloying) |
| --- | --- | --- | --- | --- |
| Quality (contamination, etc.) | A | A | C | D |
| Productivity (cost effectiveness, mass productivity) | B | C | A | A |
| Alloying capability (arbitrary composition) | A | B | C | A |
| Size controllability (nanosizing property) | A | C | A | D |
| Uniformity (particle size distribution) | C | C | A | B |
| Classification property Aggregability | B | D | A | B |
| Spheroidizing capability (nanobal) | A | D | C | B |

It is also possible to control plasma grow process by applying a magnetic field in the vicinity of the negative electrode and thus to stably maintain high-temperature plasma with lower energy. This increases the likelihood of occurrence of a current concentration phenomenon and enables more cost effective fine particle production. Moreover, since magnetic field application enables control of plasma generation and growth, it is also made possible to control the hydrogen gas production by decomposition of water molecules by plasma.

BRIEF DESCRIPTION OF DRAWINGS

FIGS. 2A-2L are SEM images, TEM images or electron beam diffraction patterns of particles of single metals (Ni, Ti, Ag, and Au) produced by a production method according to an embodiment of the present invention;

BEST MODE FOR CARRYING OUT THE INVENTION

Figure 1A:
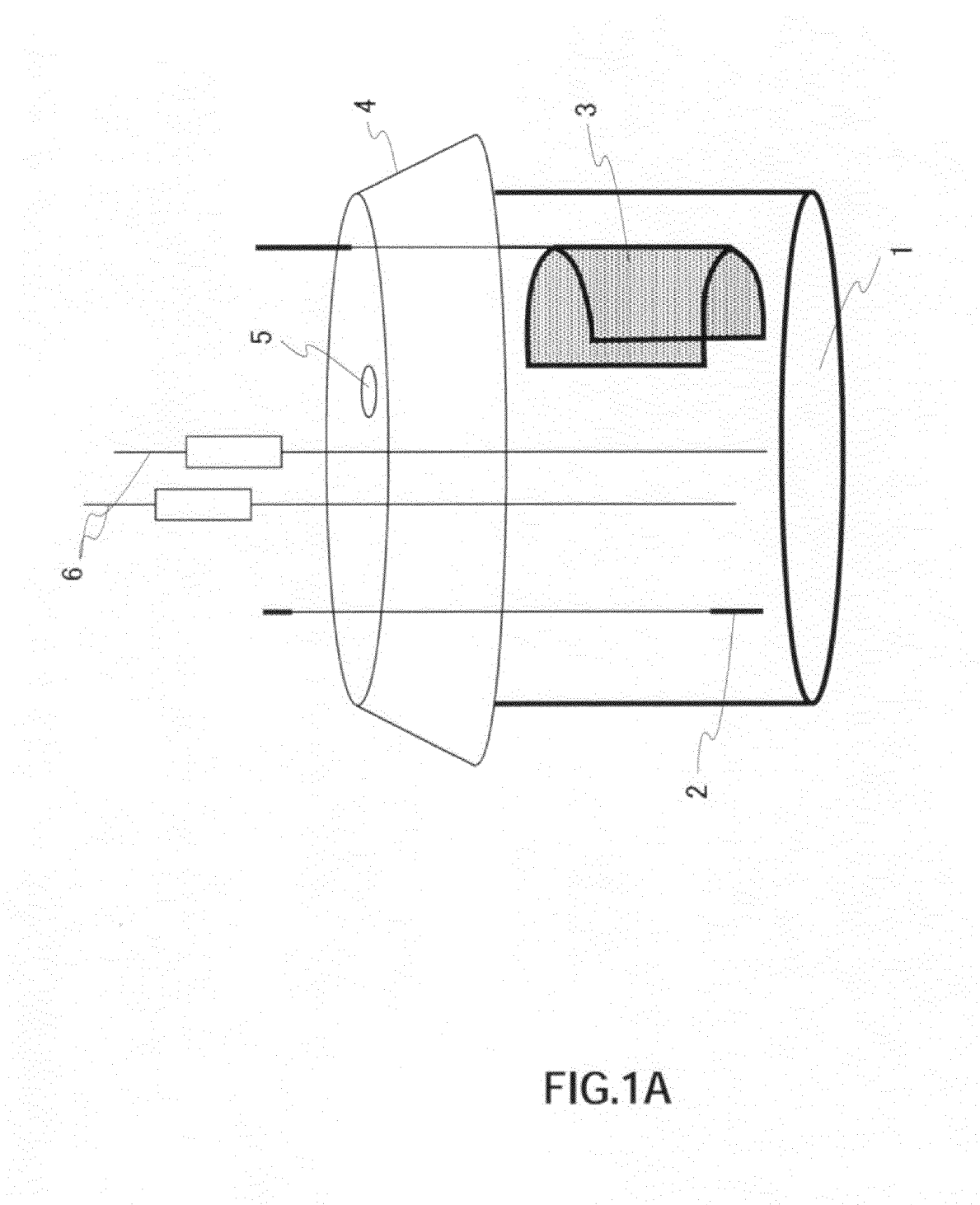
FIGS. 1A and 1B are a schematic illustration of an apparatus for carrying out a conductor fine particle production method according to an embodiment of the present invention.

With a production method of the present invention, conductor fine particles (hereinafter simply referred to as "fine particles") can be produced. As used herein, "fine particles"

refer to micro-sized particles or smaller, particularly nano-sized particles, i.e., particles with an average diameter of 10-1,000 nm. Preferably, fine particles have spherical shape; however, the particle shape is not specifically limited, and it may be needle shape, for example. Hereinafter, spherical fine particles are referred to as "nanoballs." Conductors encompass electric conductors such as metals and alloys and semiconductors such as silicon and carbon.

A production method of the present invention includes a step of applying a voltage between a pair of electrodes placed in a conductive liquid. Any solvent can be used for the preparation of the conductive liquid as long as the solvent may dissolve electrolytic substance. Examples of such solvents include organic solvents such as ethylene carbonate (EC), diethyl carbonate (DEC), propylene carbonate, and dimethyl carbonate; water; and ionic liquids. Hereinafter, water that contains electrolyte as solute is referred to as "electrolytic aqueous solution." The conductive liquid may be a molten salt having conductive property. The electrolyte may be neutral, alkaline, or acidic substance. Examples of alkaline electrolytes include carbonates such as potassium carbonate and sodium carbonate.

The conductive liquid temperature is not specifically limited as long as it is lower than temperature (which is higher than its boiling point) where the liquid will be entirely turned into gas; however, it may be around normal temperature. When the conductive liquid temperature is around normal temperature, the conductive material melted away from the negative electrode can be easily re-solidified, thereby facilitating production of fine particles. Moreover, at this temperature, it is also possible to save energy required for temperature adjustment by a heat source. On the other hand, when the conductive liquid temperature is raised beforehand, gas phase generation is facilitated around the negative electrode.

When an electrolytic aqueous solution is employed as the conductive liquid, a preferable temperature of the electrolytic aqueous solution is considered to be around 70-90° C. under atmospheric pressure. Under increased pressure, however, the temperature of the electrolytic aqueous solution may be above 100° C.

Negative electrode material serves as a source of fine particles to be produced by a production method of the present invention, and therefore, it is appropriately selected according to the type of fine particles to be produced. Negative electrode material, or fine particle source material, is preferably a conductive or semiconductive material which can be formed into a negative electrode having a smooth surface. The smooth surface can achieve a uniform electric field at the negative electrode surface. For producing spherical material such as nanoballs, material with high thermal conductivity is generally preferable. Moreover, it is preferable that the negative electrode material be stable in a conductive liquid in a state where no electric current is applied.

For example, when producing metal fine particles, it is only necessary to employ a negative electrode which is made of metal constituting those fine metal particles; and when producing carbon nanotubes, it is only necessary to employ a carbon electrode.

In addition, when producing conductive resin fine particles, it is only necessary to employ, as negative electrode material, conductive resin consisting of conductive polymer.

The shape of the negative electrode is not specifically limited; however, the negative electrode is preferably highly symmetrical in view of achieving uniform electric field intensity, and spherical shape is ideal. It is, of course, possible to employ columnar or cylindrical shape, which may be more practical shape.

Anode electrode material is not specifically limited as long as the anode electrode is stable in a conductive liquid in a state where no electric current is applied. For example, platinum may be used. The surface area of the positive electrode is preferably larger than that of the negative electrode. For example, the surface area of the positive electrode may be about 25-1000 times as large as that of the negative electrode, in order to generate a uniform electric field around the negative electrode and to cause voltage reduction, power loss and temperature increase to occur intensively in the vicinity of the negative electrode. To increase the surface area of the positive electrode, for example, the positive electrode may be made large, or the positive electrode may be formed as a cylindrical mesh electrode surrounding the negative electrode.

The positive and negative electrodes are arranged in a conductive liquid without being in contact with each other. It is preferable that only a conductive liquid exist between the positive and negative electrodes. Although it is preferable to arrange the positive electrode in such a way as to concentrically surround the negative electrode, it is not necessarily required to arrange the positive electrode so as to surround all over the negative electrode.

The distance between the positive and negative electrodes is appropriately determined such that stable glow discharge occurs in the vicinity of a surface of the negative electrode for plasma generation, and that arc discharge never occurs due to electrode-to-electrode connection via a discharge path with high current density. A typical electrode-to-electrode distance is 20-1,000 nm.

The voltage to be applied may be high enough to cause plasma generation in the vicinity of the negative electrode. When the conductive liquid is an electrolyte aqueous solution, it is 16V or greater, preferably 80V or greater, more preferably 140V or greater. When the voltage is too low, electrolysis of water molecules only occurs and plasma is not generated, and thus fine particles are not produced. A voltage of 140V or greater is generally a full plasma area that causes plasma emission from the entire surface of the negative electrode, resulting in the plasma generation virtually without depending on the type, size, etc., of negative electrode material, ingredients and concentration of the conductive liquid, etc.

In general, the voltage to be applied is generally 1,000V or less, more preferably 300V or less. Too high a voltage results in the occurrence of arc discharge between the electrodes and thus production of desired fine particle will fail.

When the conductive liquid is an electrolytic aqueous solution, voltage application causes hydrogen gas generation by electrolysis or plasma decomposition of water molecules. Thus, the present invention can also produce hydrogen by utilizing plasma.

By controlling the level of voltage to be applied, the size of resulting fine particles may be adjusted. Specifically, by increasing voltage, it is possible to reduce particle size. This is demonstrated in Examples of the present invention described below (see FIG. 10).

Application of Magnetic Field

A magnetic field may be applied in the vicinity of the negative electrode during the production of fine particles. This magnetic field can grow partial plasma, which has been generated near a part of the negative electrode, into full plasma surrounding the entire negative electrode. Specifically, the magnetic field applied in the vicinity of the negative electrode can shorten the time it takes for partial plasma to grow into full plasma (see FIG. 12).

Once full plasma is generated, it causes a current concentration phenomenon more extensively than partial plasma.

"Current concentration phenomenon" is a phenomenon peculiar to atmospheric weakly-ionized plasma, where a uniform electric current passing through plasma changes into an intermittent, locally-concentrated current at multiple sites of the negative electrode surface. This current concentration phenomenon leads to melting of negative electrode surface, and then fine particles are formed. Accordingly, magnetic field application facilitates the generation of the current concentration phenomenon and thus can reduce voltage, enabling cost effective fine particle production.

As the magnetic field applied in the vicinity of the negative electrode can control the plasma generation and plasma growth, it can also control the plasma-mediated hydrogen production process.

The above magnetic field, however, may interrupt electron behavior and prevent plasma generation in some cases. For this reason, magnetic field application is more preferably following plasma generation.

It is preferable for this magnetic field to contain a component which is perpendicular to an electric current flowing from the negative electrode to the positive electrode, because partial plasma can be readily grown into full plasma which entirely covers the negative electrode. The possible underlying mechanism of this is as follows: Application of a magnetic field containing a component perpendicular to the current flow direction can prevent the generation of heat flux which is perpendicular to the magnetic field direction, whereby heat generated near the negative electrode becomes difficult to diffuse so that plasma can easily cover the negative electrode entirely. Moreover, elevated plasma temperature achieves stable plasma retention. Specifically, the magnetic field preferably contains a component parallel to the major axis of the negative electrode. More preferably, the magnetic field contains a component parallel to the negative electrode surface. Furthermore, the magnetic field preferably has a magnetic flux density (intensity) of 0.05 tesla (500 gauss) or greater.

There are no particular limitations on the method of applying a magnetic field in the vicinity of the negative electrode. For example, a magnetic field generated using an electromagnet may be applied in the vicinity of the negative electrode. Examples of electromagnets include Helmholtz coils. In addition, the magnetic field may be partially enhanced by placing a high-magnetic permeability magnetic metal in the vicinity of the negative electrode. Examples of magnetic metals include ferrite.

The magnetic flux density of the magnetic field applied in the vicinity of the negative electrode may be 1 tesla or greater. When the magnetic flux density is 1 tesla or greater, it results in "micronization" of a current concentration phenomenon due to hall effect. "Micronization of current concentration phenomenon" as used herein means that a current concentration phenomenon occurs more frequently (temporally) and more densely (spatially). This achieves mass production of finer particles.

A production method of the present invention includes a series of the following steps of: applying a voltage between a pair of positive and negative electrodes so as to heat a conductive liquid around the negative electrode to a temperature equal to or greater than its boiling point for gasification; and generating plasma in a gas phase generated in the vicinity of, or around, the negative electrode, so that the negative electrode material is partially melted and then re-solidified to produce fine particles.

When plasma is generated in the gas phase near the negative electrode, a current concentration phenomenon occurs at the electrode/solution interface. Thus, the surface temperature of the material constituting the negative electrode locally exceeds its melting point, resulting in local melting of the material. Droplets of the molten material liberated from the negative electrode surface can become spherical balls (nanoballs) due to surface tension (in this case, spherical fine particle will be produced). After that, the molten material is cooled by the plasma, neutral gas and surrounding conductive liquid, and is re-solidified to produce fine particles.

Also in this case, a magnetic field may be applied in the vicinity of the negative electrode to facilitate the generation of full plasma to accelerate the occurrence of current concentration phenomenon.

Voltage application increases the electrode temperature due to power loss at the negative electrode surface and gasifies a portion of a conductive liquid (e.g., electrolytic aqueous solution) around the negative electrode by raising the conductive liquid temperature to a level equal to or greater than the boiling point. It is preferable to produce a sheath-shaped gas phase around the negative electrode. For gas phase generation, it is only necessary that at least the liquid temperature near the negative electrode exceed the boiling point. In order for the liquid temperature near the negative electrode to exceed the boiling point easily, the temperature of the entire solution may be set somewhat higher beforehand.

Glow discharge occurs in the generated gas phase to produce plasma. Namely, the plasma generated according to the present invention is glow discharge plasma. The presence of plasma may be confirmed by observation of light emission from the plasma.

There are no particular limitations on the method of collecting produced fine particles. For example, the conductive liquid may be caused to swirl about the major axis of the negative electrode, so that fine particles with a certain diameter (or weight) settle at the bottom of the apparatus for collecting. By applying a magnetic field containing a component perpendicular to an electric current flowing from the negative electrode to the positive electrode, the swirling flow in the cell can be generated by Lorentz force.

Fine Particles

Physical properties, e.g., shape, size (diameter), particle size distribution, composition, and crystallinity of the fine particles to be produced may be controlled by controlling discharge conditions. Discharge conditions include voltage level, current level, voltage and current fluctuations; discharge time; type, concentration and temperature of conductive liquid; elemental composition of electrode; electrode shape; initial electrode surface roughness; electrode temperature; and type and concentration of impurity or added element in the electrode material. Different discharge conditions lead to production of fine particles of different conditions, e.g., fine particles with oxidized surface (FIGS. 3A and 3B), fine particles with defects (FIG. 4), etc.

For example, when voltage is raised, the size of fine particles can be made small.

Moreover, physical properties of fine particles can also be controlled by the direction, intensity, and intensity distribution of a magnetic field applied. For example, suppose discharge conditions other than magnetic field conditions are constant, increasing magnetic field intensity (magnetic flux density) facilitates the occurrence of current concentration phenomenon and thus mass production of finer particles can be achieved. Moreover, when the negative electrode material is ferromagnetic material such as iron, fine particles produced along with magnetic field application in the vicinity of the negative electrode may be magnetic particles. Magnetic field application enables to control the particle size distribution of fine particles.

In order to control fine particle shape, the degree of current concentration may be enhanced. To achieve this heat diffusion from the negative electrode may be prevented; voltage and magnetic field intensity may be enhanced; and so forth. Prevention of heat diffusion can be accomplished for instance by appropriate selection of the shape or physical properties of the negative electrode, and/or connection form between the negative electrode and negative electrode lead.

It is possible to enhance the energy of electrons by increasing voltage and thus to increase the degree of current concentration.

It is also possible to increase the degree of current concentration by hall effect by increasing the magnetic field intensity.

Physical properties of fine particles produced as described above vary depending on the discharge condition, but average particle diameter is 10-1,000 nm, with particle diameters ranging from 3 nm to 2,000 nm. Particle size can be measured for instance by calculating the circle equivalent diameter based on the area of a projected SEM image.

Fine particles produced by a production method of the present invention may be spherical balls (nanoballs). As used herein, "spherical ball" means that, on any cross section of a particle, the diameter of one direction is 95-105%, more preferably 98%-102% of that of the other direction intersecting at right angle.

Applications of Fine Particles

Fine particles produced according to the present invention are extremely small in size and therefore, when used as material for magnetic recording media, unprecedentedly high-recording density can be realized. Moreover, fine particles produced according to the present invention have high surface area-to-volume ratios and thus have potential to serve as excellent metal photocatalyst.

Further, since fine particles produced according to the present invention which are extremely small in size may undergo melting point reduction and changes in the physical property transition point (e.g., Curie point) due to ultra-small size effect, they can be utilized for the development of novel semiconductor elements, ferroelectric elements, and ferromagnetic elements. Fine particles produced according to the present invention employing conductive polymer as a material for the negative electrode may become a novel source for pharmaceutical products (e.g., cosmetics). Furthermore, fine particles produced according to the present invention employing metals (including alloys) as a source may present an innovative development in all aspects of engineering fields including fine particle production.

Production Apparatus

FIG. 1A is a schematic illustration of a fine particle production apparatus for carrying out a production method of the present invention.

A production method of the present invention is carried out with a fine particle production apparatus shown in FIG. 1A, which includes cell 1 as a container of a conductive liquid; a pair of separate electrodes (negative electrode 2 and positive electrode 3) placed in the cell; and a DC power source (not shown) for applying voltage between the electrodes. This apparatus is similar to conventional water electrolysis apparatus.

Figure 1B:
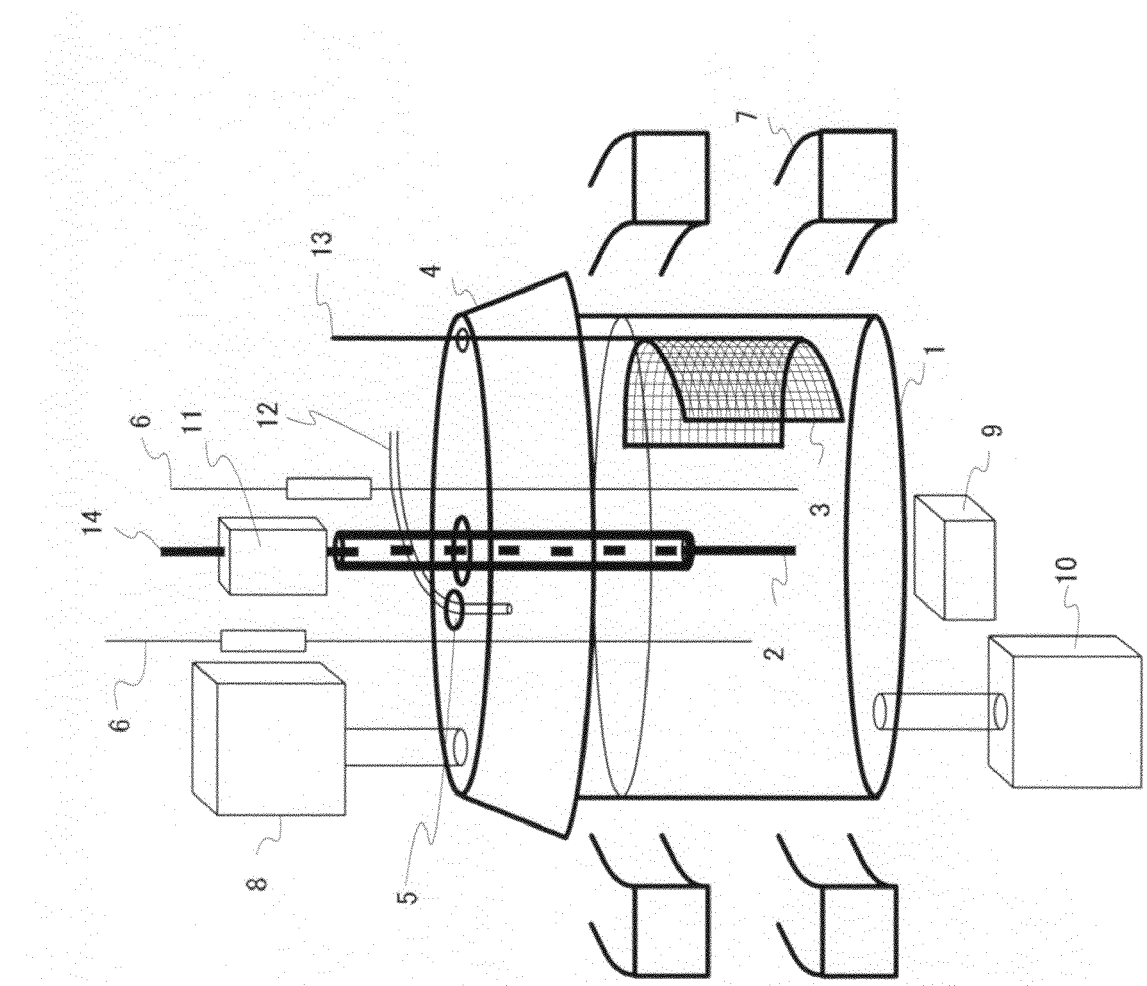

A production method of the present invention may be carried out with a fine particle production apparatus shown in FIG. 1B, which includes, in addition to the above members, generated gas recovery hose 12 for recovering generated gas (hydrogen gas in the case where water is employed as a solvent of the conductive liquid); generated gas recovery unit (not shown) connected to generated gas recovery hose 12; electromagnets 7 for applying a magnetic field in the vicinity of negative electrode 2; power source (not shown) for electromagnets 7; conductive liquid supplier 8 for refilling cell 1 with a conductive liquid for continuous operation; bottom liquid recovery unit 10 for recovering liquid at the bottom of the cell which contains fine particles produced; and magnetic stirring unit 9 for magnetically stirring the solution in the cell.

The material of cell 1 is not specifically limited; glass, Teflon®, polyethyl ether ketone (PEEK), etc., may be employed. These materials should however be stable against the conducive liquid such as aqueous solution. The cell volume may be appropriately set. As the above DC power source, any DC power source may be employed that can apply voltage capable of generating plasma (e.g., 16-300V) between the electrodes.

The above production apparatus may include cell cover 4 primarily made of electrical insulator. Cell cover 4 may be provided with opening 5 through which water is supplied or generated gas (e.g., hydrogen gas) is exhausted. The above production apparatus may be further provided with means of maintaining the conductive liquid temperature, i.e., heating or cooling means with control mechanism (thermocouple 6 is shown in FIGS. 1A and 1B), a temperature sensor (not shown), etc.

Examples

Hereinafter, the present invention will be described in more detail with reference to Examples, which however shall not be construed as limiting the scope of the present invention.

An apparatus shown in FIG. 1A was prepared. As negative electrode 2, a thin metal wire (diameter=1.0 mm, length=16 mm, electrode surface area=0.5 cm$^2$) was employed. Nickel (Ni), titanium (Ti), silver (Ag), or gold (Au) was employed as the metal for the thin metal wire. The thin metal wire was covered with Teflon® at a part other than the discharge part. A mesh-shaped platinum electrode (50 mm×100 mm) was employed as positive electrode 3.

Glass cell 1 was filled with calcium carbonate ($K_2CO_3$) aqueous solution (0.1 mol/dm$^3$). The electrode pair was dipped in the aqueous solution at a depth of within 100 mm from the liquid surface. The distance between the positive electrode and negative electrode was set to 50 mm.

Negative electrode discharge electrolysis was carried out, with cell voltage set to 80-160V and discharge time set to about 30 minutes.

Due to power loss at the negative electrode surface, the electrode temperature increased to a level exceeding the solution's boiling point, forming a sheath-shaped gas phase which contains water vapor at the negative electrode/solution interface. The cell voltage was high enough to cause glow discharge in the gas phase (occurrence of discharge was confirmed only around the negative electrode). The solution temperature was kept at around 70-90° C.

After negative electrode discharge electrolysis, negative electrode surface was observed with a scanning electron microscope (SEM) (FIGS. 2A-2D). Further, liberated fine particles were observed with a transmission electron microscope (TEM) (FIGS. 2E-2H). As shown in FIGS. 2A-2L, fine particles ranging about 10 nm-1 μm in diameter were observed; even fine particles of about 10 nm in diameter were kept spherical. Under certain discharge conditions, ultrafine particles of less than 10 nm in diameter (3-5 nm) were produced. FIGS. 2I-2L respectively show electron beam diffraction patterns of fine particles shown in FIGS. 2E-2H. In FIGS. 2I-2L, the right half images are theoretical diffraction patterns of the corresponding negative electrode materials (fine particle source), and the left half images are actual diffraction patterns measured for the corresponding fine particles. The actual diffraction patterns of the fine particles shown in FIGS. 2I, 2K and 2L virtually match the theoretical diffraction patterns of their source material, suggesting that these fine particles are cubical crystals as are their source material.

On the other hand, titanium fine particles exhibited rutile structure (FIG. 2J) in contrast to the source material (negative electrode material). This is considered to be attributed to the oxidization of titanium fine particle surface.

All of the produced fine particles were not contaminated by the solution and were of high purity. Particle surface was oxidized, and thickness of the oxidized surface layer was not greater than 1 nm.

Figure 3A:
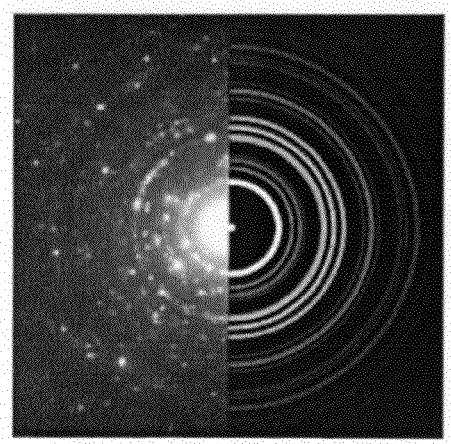
FIG. 3A is an electron beam diffraction pattern of titanium fine particles produced by a production method according to an embodiment of the present invention.
Figure 3B:
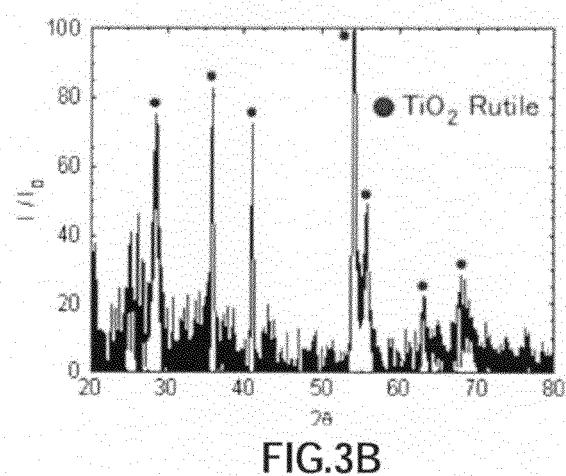
FIG. 3B is an X-ray diffraction pattern of titanium fine particles produced by a production method according to an embodiment of the present invention.

FIGS. 3A and 3B show an electron beam diffraction pattern and an X-ray diffraction spectrum of Ti fine particles produced, respectively. Energy dispersive X-ray spectroscopy (EDS) confirmed that Ti fine particle surface contains $TiO_2$. The crystal structure expected from the electron beam diffraction pattern shown in FIG. 3A and X-ray diffraction spectrum shown in FIG. 3B was consistent with the $TiO_2$ rutile structure expected by theoretical calculation.

Figure 4:
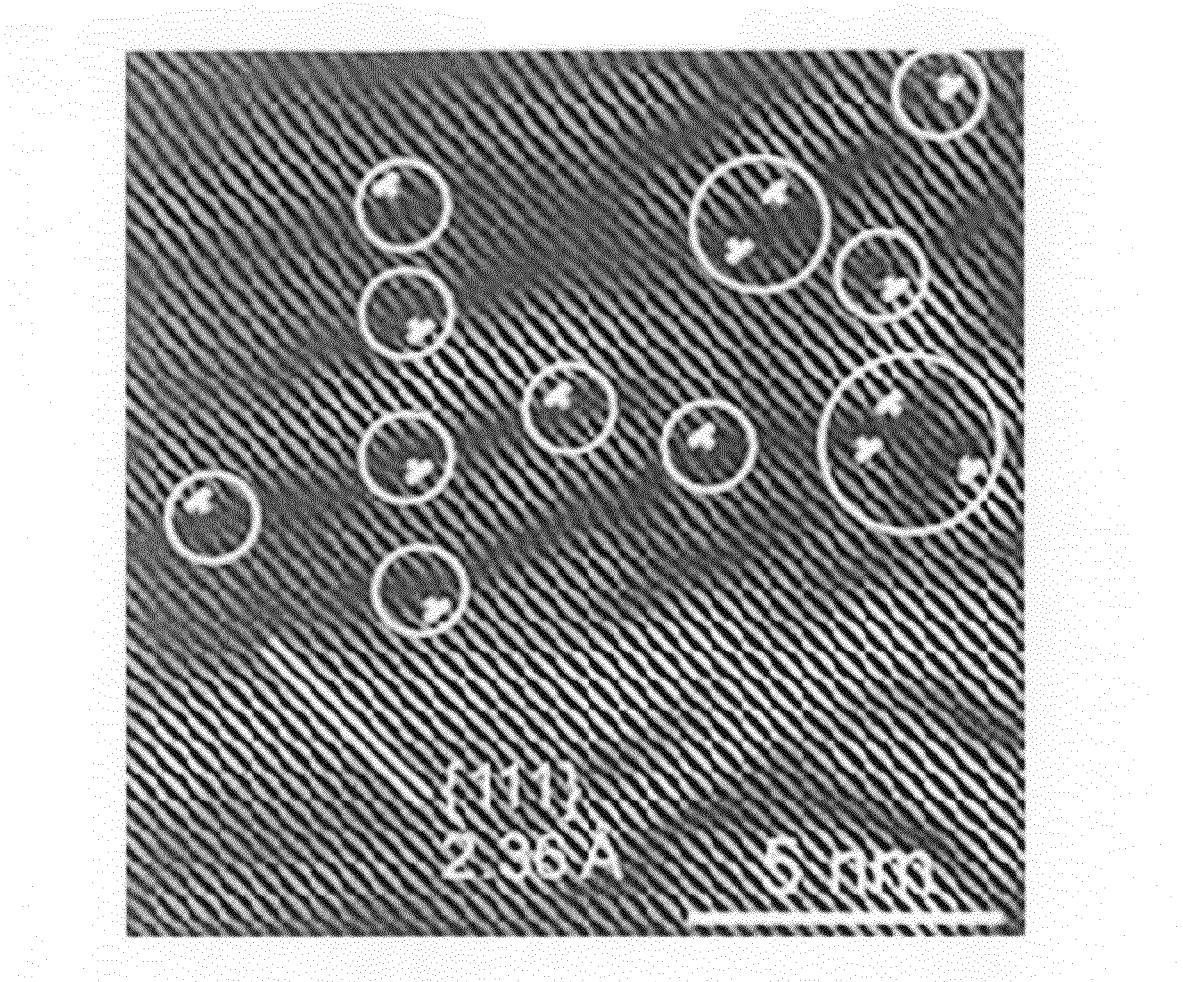
FIG. 4 is a TEM image of gold fine particles produced by a production method according to an embodiment of the present invention.

High-resolution observation (TEM observation) of the produced fine particles confirmed the presence of many defects in the particle. FIG. 4 indicates a sequence of close-packed planes [111] and defect sites. These defects are considered to be produced due to rapid cooling of droplets of molten negative electrode material in the conductive liquid. With this effect, fine particles with amorphous structure may be produced. Specifically, when alloys which easily become amorphous are employed as the material for the negative electrode, metal glass may be obtained.

Figure 5:
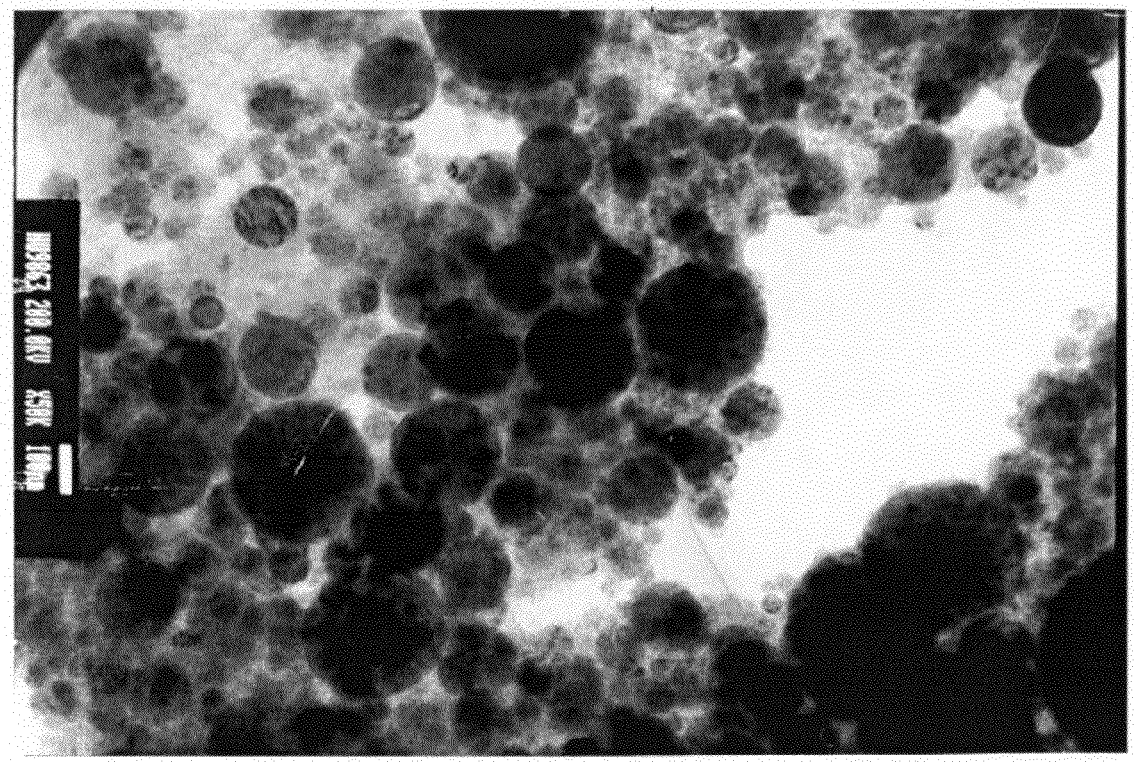
FIG. 5 is a TEM image of stainless steel alloy fine particles produced by a production method according to an embodiment of the present invention.
Figure 6:
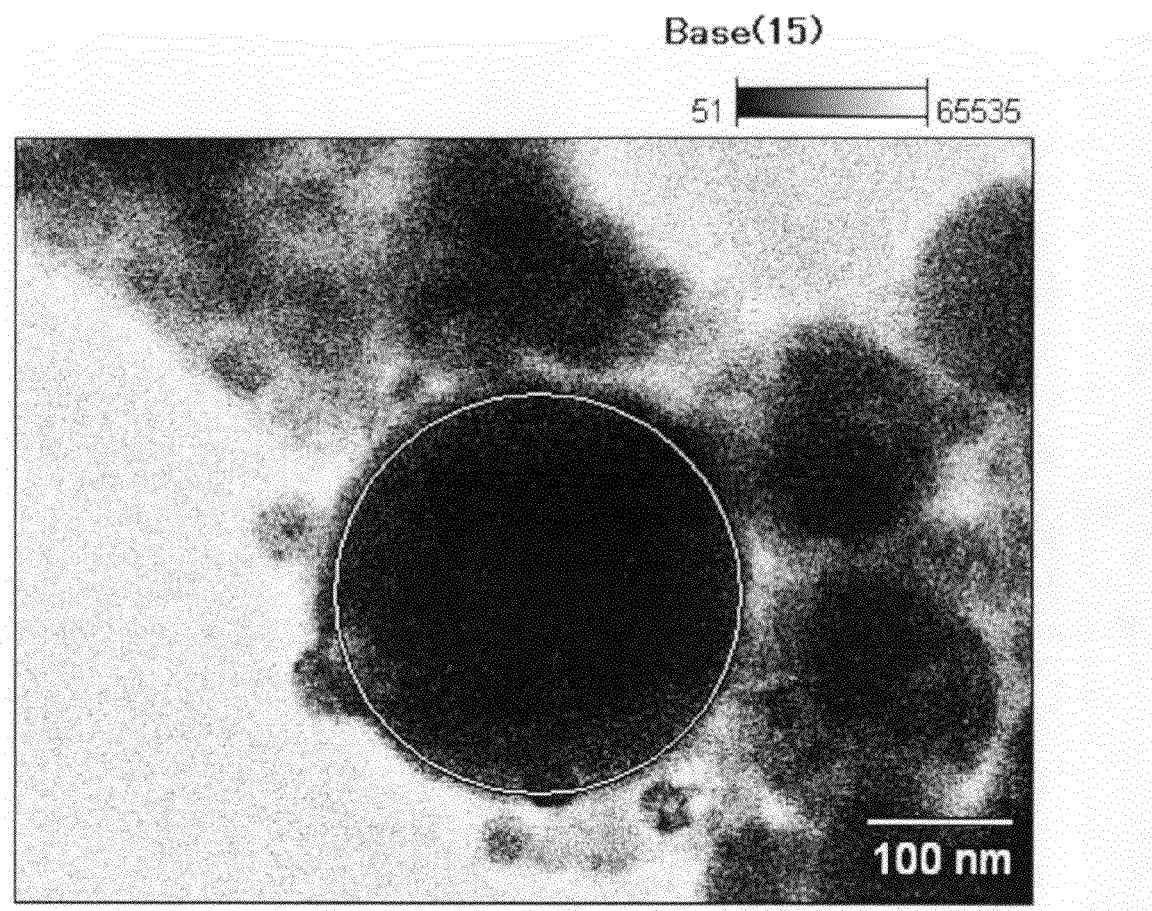
FIG. 6 is a TEM image of stainless steel alloy fine particles produced by a production method according to an embodiment of the present invention.

FIG. 5 shows a TEM image of fine particles produced from austenite stainless steel (SUS 316). FIG. 5 indicates that spherical stainless alloy fine particles of several nanometers to 500 nm in diameter were produced. FIG. 6 shows an austenite stainless steel particle of about 300 nm in diameter and also indicates this particle is spherical.

Figure 7:
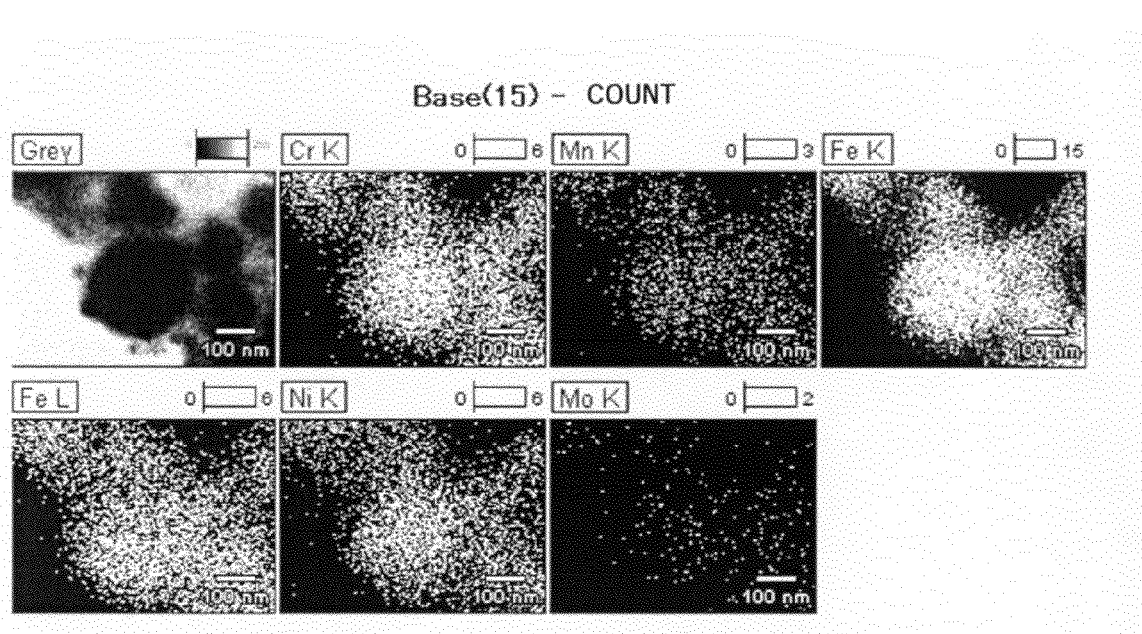
FIG. 7 show concentration maps of stainless steel alloy fine particle elements analyzed by transmission electron microscopy-energy dispersive spectroscopy (TEM-EDS)

FIG. 7 shows concentration maps of elements of the fine particle shown in FIG. 6, analyzed by transmission electron microscopy-energy dispersive spectroscopy (TEM-EDS). FIG. 7 shows distributions of the elements of the fine particle measured by detecting corresponding characteristic X-rays. In CrK, MnK, FeK, NiK and MoK, elemental distributions are shown which are measured based on the characteristic X-rays unique to each element, which emits when an electron falls from an outer shell to the K shell in each atom. In FeL, Fe distribution is shown which is measured based on the characteristic X-ray which emits when an electron falls from an outer shell to the L shell in the iron atom. FIG. 7 indicates that the above elements exist at high density in the fine particle.

Figure 8:
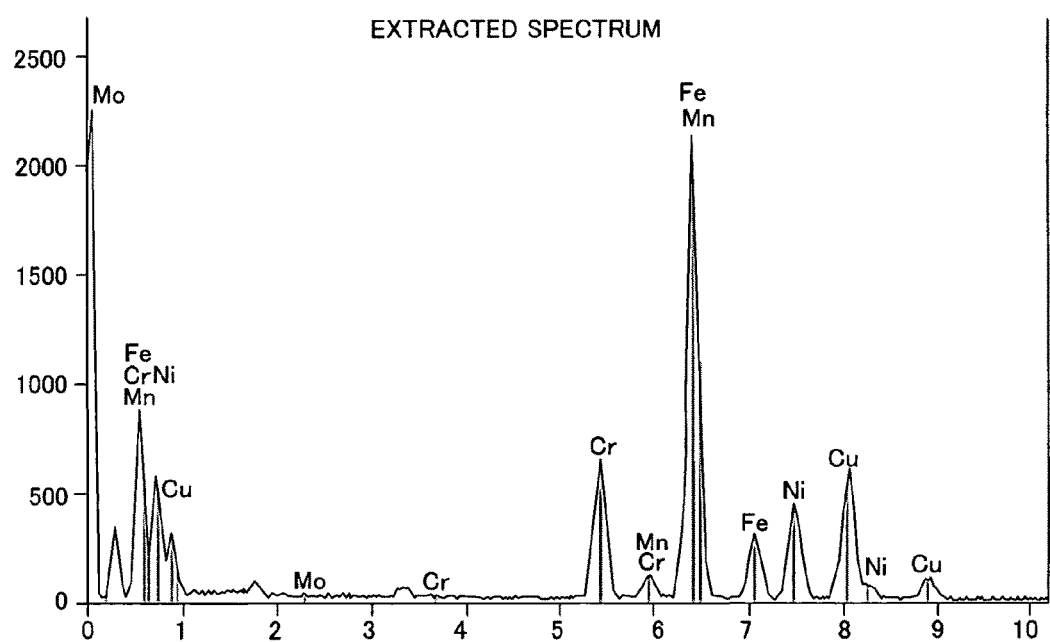
FIG. 8 is a spectrum of stainless steel alloy fine particle elements analyzed by transmission electron microscopy-energy dispersive spectroscopy (TEM-EDS)

FIG. 8 shows a constituent element spectrum of the entire fine particle shown in FIG. 6 analyzed by transmission electron microscopy-energy dispersive spectroscopy (TEM-EDS). In FIG. 8 the horizontal axis represents characteristic X-ray energy in units of keV.

Table 2 shows proportions of the elements of the fine particle of FIG. 6 in units of weight percent. The values in Table 2 were calculated from FIGS. 7 and 8 under the following analysis condition:
Filter fitting chi-square value: 93.809
Correction scheme: Cliff-Lorimer (MBTS) (no absorption)
Acceleration voltage: 200.0 kV
Take-off angle: 25.0 deg

TABLE 2

| Element | Weight % | Error |
|---------|----------|-------|
| Cr | 17.21 | +0.28 |
| Mn | 1.18 | +0.13 |
| Fe | 67.22 | +0.57 |
| Ni | 14.07 | +0.39 |
| Mo | 0.3 | +0.18 |

Table 3 shows an elemental composition of a particle source material, i.e., an austenite stainless steel negative electrode.

TABLE 3

| Element | Weight % |
|---------|----------|
| Cr | 16-18 |
| Mn | 0-2 |
| Fe | 62-72 |
| Ni | 10-14 |
| Mo | 2-3 |

From Tables 2 and 3, it was confirmed that produced stainless steel alloy fine particles have almost the same elemental composition as the particle source material.

Figure 9:
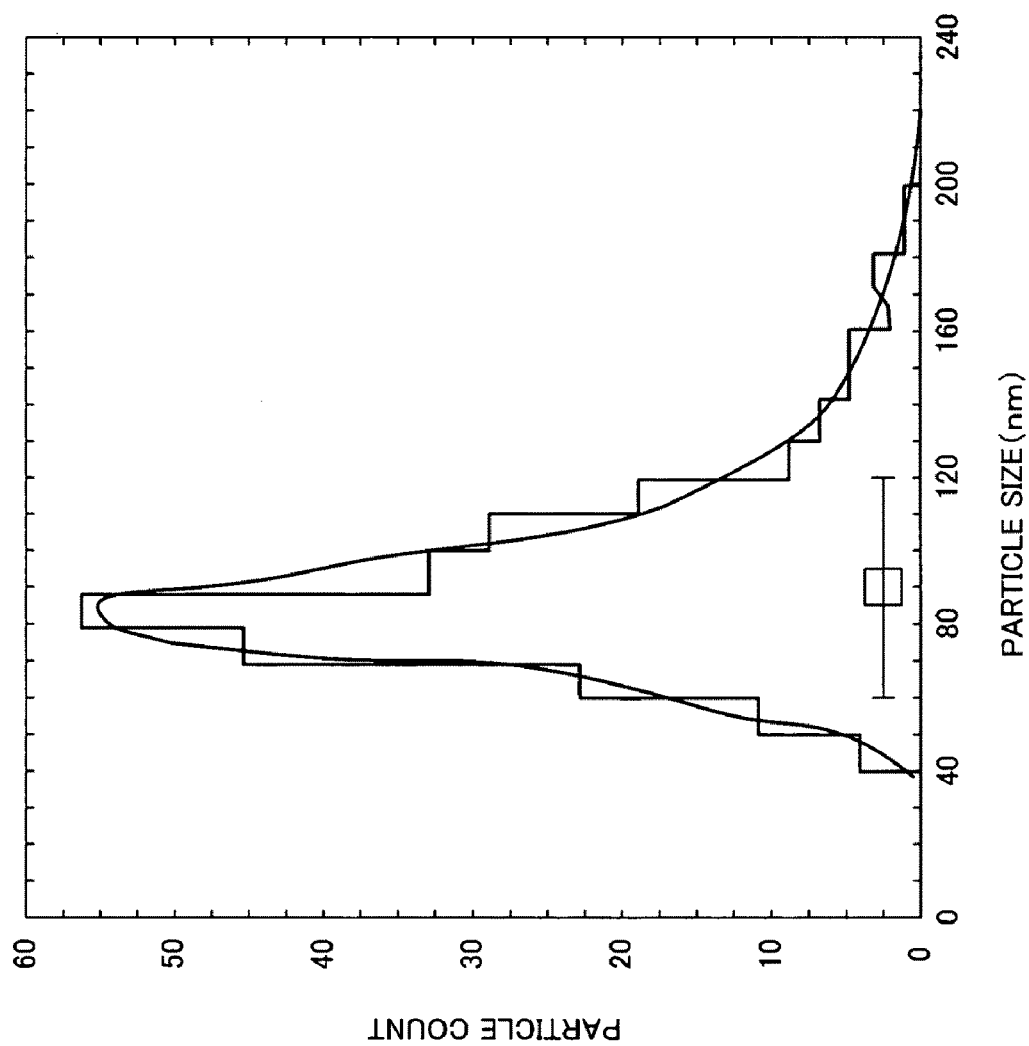
FIG. 9 is a graph of particle size distribution of conductor fine particles produced by a production method according to an embodiment of the present invention.

FIG. 9 shows a particle size distribution of fine particles produced according to the present invention, where the vertical axis represents particle count and the horizontal axis represents particle diameter (nm), which is a circle equivalent diameter calculated based on the area of a projected SEM image. More specifically, FIG. 9 shows a particle size distribution of nickel fine particles produced using as a negative electrode a 1.5 mm-diameter nickel thin wire while applying 160V voltage for 30 minutes. The nickel fine particles produced under the above condition had a minimum diameter of 46 nm, maximum diameter of 180.5 nm, and average particle diameter of 93.8 nm.

Figure 10:
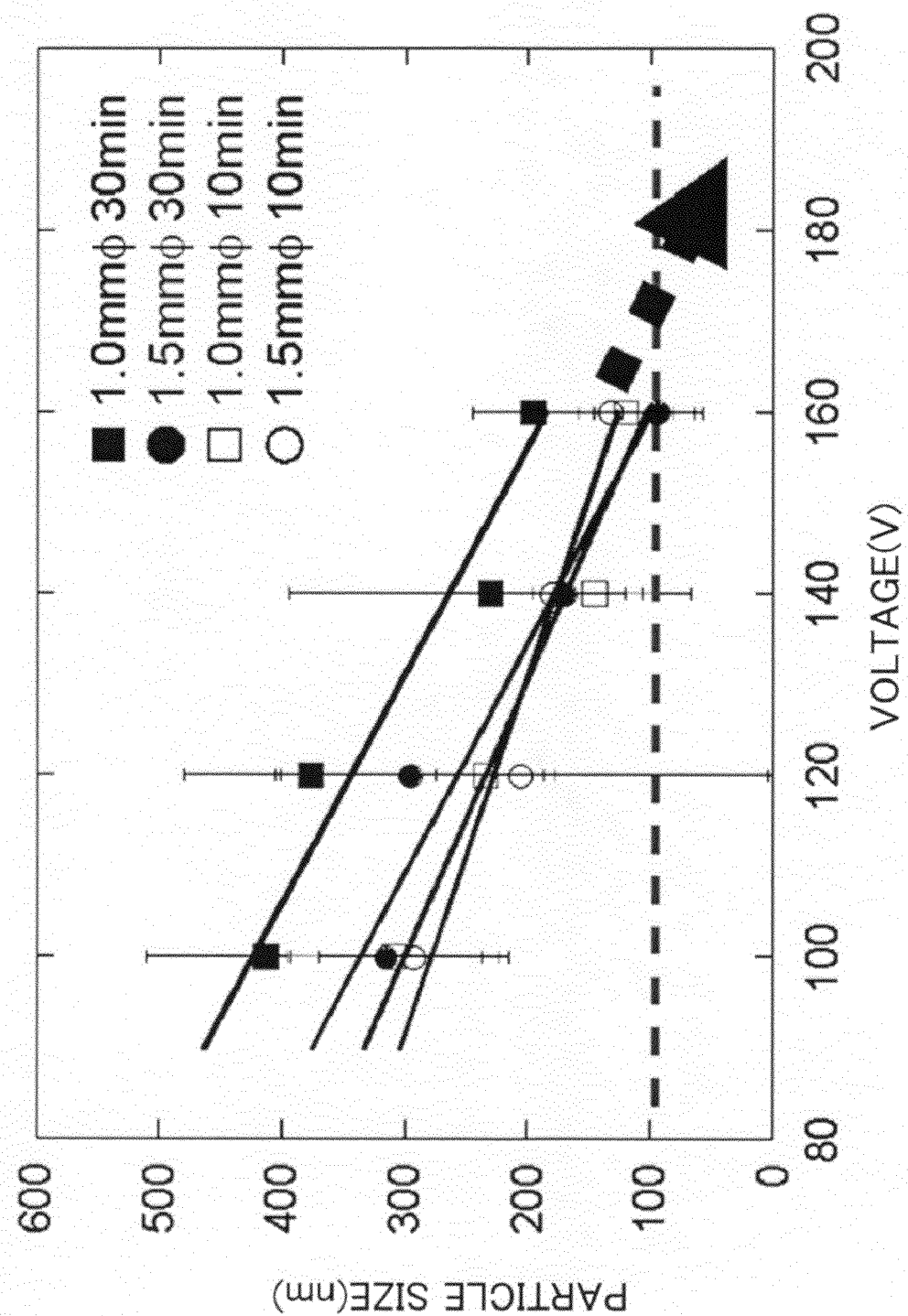
FIG. 10 is a graph of particle diameter of conductor fine particles produced by a production method according to an embodiment of the present invention vs. applied voltage level.

FIG. 10 is a graph showing average particle diameters of Ni fine particles (nanoparticles) calculated based on SEM images as a function of cell voltage, where the vertical axis represents particle diameter and the horizontal axis represents value of applied voltage.

Nickel fine particles were produced under different conditions: The diameter of the Ni thin wire was set to 1.0 mm or 1.5 mm, and voltage application time was set to 10 minutes or 30 minutes. In FIG. 10, black square symbol represents data where Ni thin wire diameter was set to 1.0 mm and voltage application time was set to 30 minutes; black round symbol represents data where Ni thin wire diameter was set to 1.5 mm and voltage application time was set to 30 minutes; white square symbol represents data where Ni thin wire diameter was set to 1.0 mm and voltage application time was set to 10 minutes; and white round symbol represents data where Ni thin wire diameter was set to 1.5 mm and voltage application time was set to 10 minutes.

In either case, voltage increase tended to reduce particle diameter. When voltage exceeds 160V, fine particles of less than 100 nm in average diameter were obtained, which are expected to exert nano effects which cause physical property changes. The difference in particle diameter of resulting fine particles among different negative electrode materials is considered to be derived from the difference in heat conductivity, electric conductivity and chemical potential.

Figure 11:
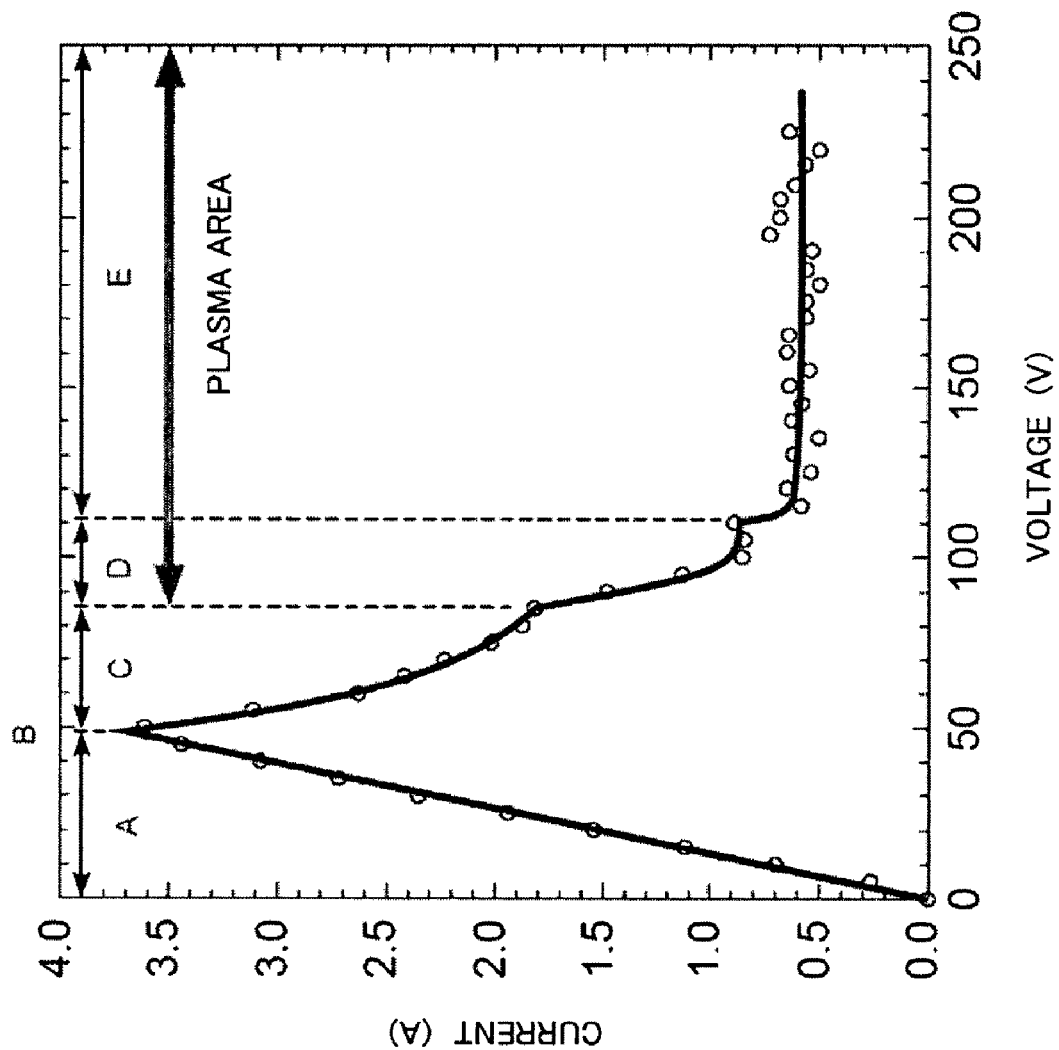
FIG. 11 is a graph of current level vs. applied voltage level.

FIG. 11 shows a relationship between plasma generation and applied voltage level. Using a nickel thin wire (diameter=1.5 mm, length=10 mm) as a negative electrode, it was determined, at different voltage levels, whether plasma generation occurs in the vicinity of the negative electrode. In the graph the vertical axis represents current value, and horizontal axis represents voltage value. It was confirmed that while no or little plasma was generated in the typical electrolysis area A and transition area C and at breakdown point B, plasma was clearly generated in the partial plasma area D or full plasma area E, i.e., when about 80V or greater voltage was placed.

Figure 12:
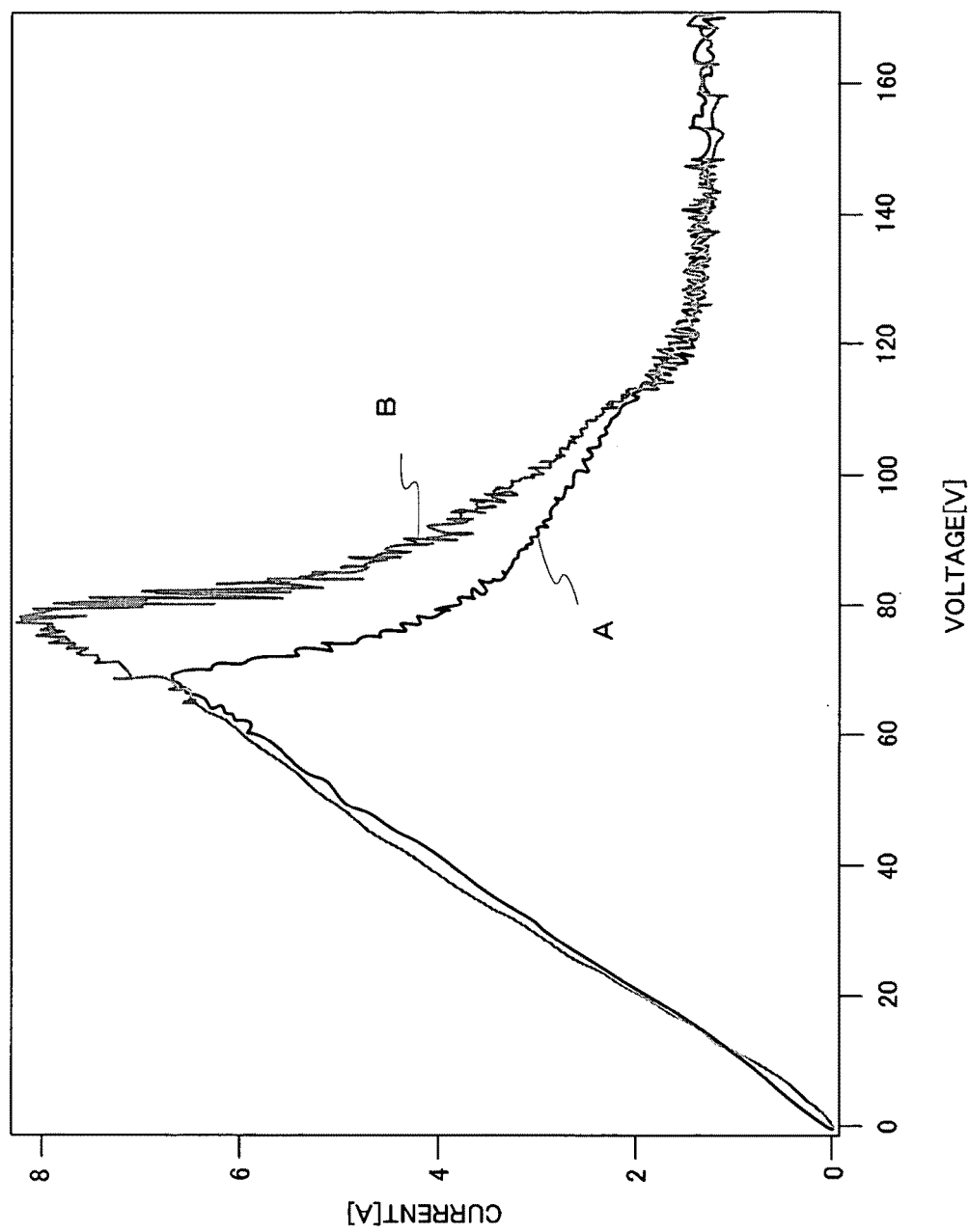
FIG. 12 is a graph showing the difference in discharge characteristics between with and without application of a magnetic field.

FIG. 12 shows a relationship between discharge characteristics and presence of a magnetic field. Using a nickel thin wire (diameter=1.5 mm, length=30 mm) as a negative electrode, current flowing from the positive electrode to negative electrode was measured at different voltage levels with and without application of a magnetic field containing a component parallel to the negative electrode surface. A cylindrically-curved platinum mesh was employed as the positive electrode and was placed 48 mm away from the negative electrode so as to surround it. The intensity (magnetic flux density) of the applied magnetic field was 0.1 tesla (1,000 gauss) and a Helmholtz coil was used as a magnetic field application means. The same condition was used except for the presence of a magnetic field applied. Calcium carbonate ($K_2CO_3$) aqueous solution (0.1 $mol/dm^3$) was employed as the conductive liquid.

In FIG. 12, line A indicates changes in current with respect to voltage when no magnetic field is applied; line B indicates changes in current with respect to voltage when a magnetic field is applied. As can be seen from FIG. 12, when a magnetic field is applied, higher voltage and higher current are required for transition from the phase that current flows in accordance with Ohm's law (ohmic phase) to the next phase that plasma plays a key role as conductive medium for current-flowing (plasma-mediated phase). This suggests that magnetic field application suppresses the generation of partial plasma. In the plasma-mediated phase, on the other hand, current reduction is remarkable when a magnetic field is applied. This suggests that once partial plasma is generated, full plasma is formed faster with than without magnetic field application.

Therefore, it can be learned that the generation of partial plasma and generation of full plasma can be controlled by magnetic field application.

Further, when the conductive liquid is an electrolytic aqueous solution, hydrogen is generated in the ohmic phase by electrolysis, and in the plasma-mediated phase, hydrogen is generated by plasma decomposition of water molecules. As the plasma generation can be controlled by magnetic field application, it is also possible to control the ratio of contribution of the plasma decomposition and electrolysis to hydrogen generation.

The present application claims the priority of Japanese Patent Application No. 2007-034698 filed on Feb. 15, 2007, the entire contents of which are herein incorporated by reference.

INDUSTRIAL APPLICABILITY

With the present invention, it is possible to produce conductor fine particles much more inexpensively than other conventional production methods. By controlling discharge conditions, it is also possible to produce conductor fine particles with desired size (e.g., nanosize), shape, etc.

Conductor fine particles produced according to the present invention are used in a variety of applications; for example, they can be contained in semiconductor sealing materials, fine films, display sealing materials, ultra large-area chemical catalysts, cosmetics, pharmaceuticals, etc.

Moreover, it is also expected that complex conductor fine particles or multilayered conductor fine particles are produced by combining thermal fluid control or chemical reactions in the liquid phase near the electrode.

Fine particles produced according to the present invention are extremely small in size and therefore, when used as material for magnetic recording media, unprecedentedly high-recording density can be realized. Moreover, fine particles produced according to the present invention have high surface area-to-volume ratios and thus have potential to serve as excellent metal photocatalyst.

Further, since fine particles produced according to the present invention which are extremely small in size may undergo melting point reduction due to ultra-small size effect and changes in the physical property transition point (e.g., Curie point), they can be utilized for the development of novel semiconductor elements, ferroelectric elements, and ferromagnetic elements. Fine particles produced according to the present invention employing conductive polymer as a material for the negative electrode may become a novel source for pharmaceutical products (e.g., cosmetics). Furthermore, fine particles produced according to the present invention employing metals (including alloys) as a source may present an innovative development in all aspects of engineering fields including fine particle production.

The invention claimed is:

1. A method for producing conductor fine particles comprising:
    applying a voltage between a pair of positive and negative electrodes placed in a conductive liquid to generate plasma around the negative electrode;
    applying a magnetic field around the negative electrode; and
    partially melting a conductive material constituting the negative electrode followed by re-solidifying to produce fine particles.

2. The method according to claim 1, wherein the direction of the magnetic field is parallel with the major axis of the negative electrode.

3. The method according to claim 1, wherein the magnetic field has a magnetic flux density of 0.05 tesla or greater.

4. The method according to claim 1, wherein the magnetic field has a magnetic flux density of 1 tesla or greater.

5. The method according to claim 1, wherein the step of applying a magnetic field is performed after the step of generating plasma and before the step of partially melting the conductive material.

6. The method according to claim 1, wherein the conductive liquid contains an electrolytic substance and a liquid which can dissolve the electrolytic substance.

7. The method according to claim 6, wherein a solvent of the conductive liquid is ethylene carbonate (EC), diethyl carbonate (DEC), propylene carbonate, dimethyl carbonate, water, or ionic liquid.

8. The method according to claim 1, wherein the conductive liquid contains water, and hydrogen is generated together with conductor fine particles by the method.

9. The method according to claim 1, wherein the positive electrode has a surface area larger than the surface area of the negative electrode.

10. The method according to claim 1, wherein the surface area of the positive electrode is 25 to 1,000 times as large as the surface area of the negative electrode.

11. The method according to claim 1, wherein the voltage is 10-1,000V.

12. The method according to claim 1, wherein the voltage is 80-300V.

13. The method according to claim 1, wherein the fine particles have an average particle diameter of 10-1,000 nm.

14. The method according to claim 1, wherein the fine particles are spherical.

15. The method according to claim 1, wherein the fine particles have particle diameters ranging from 3 nm to 2,000 nm.

* * * * *